United States Patent
Franaszek

(10) Patent No.: US 7,904,660 B2
(45) Date of Patent: *Mar. 8, 2011

(54) PAGE DESCRIPTORS FOR PREFETCHING AND MEMORY MANAGEMENT

(75) Inventor: Peter Franaszek, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 631 days.

This patent is subject to a terminal disclaimer.

(21) Appl. No.: 11/844,086

(22) Filed: Aug. 23, 2007

(65) Prior Publication Data

US 2007/0294483 A1 Dec. 20, 2007

Related U.S. Application Data

(63) Continuation of application No. 10/326,634, filed on Dec. 20, 2002, now Pat. No. 7,334,088.

(51) Int. Cl.
*G06F 12/00* (2006.01)
(52) U.S. Cl. ............ 711/137; 711/3; 711/118; 711/204; 711/213; 712/207
(58) Field of Classification Search ............... 711/3, 118, 711/137, 154, 204, 213, 144, 145, 203; 712/207, 712/237, 238, 239, 240
See application file for complete search history.

(56) References Cited

U.S. PATENT DOCUMENTS

| | | | |
|---|---|---|---|
| 5,600,817 A * | 2/1997 | Macon et al. | 711/137 |
| 5,761,468 A * | 6/1998 | Emberson | 712/207 |
| 6,047,363 A * | 4/2000 | Lewchuk | 711/213 |
| 6,134,643 A | 10/2000 | Kedem et al. | |
| 6,195,735 B1 * | 2/2001 | Krueger et al. | 711/204 |
| 6,292,871 B1 * | 9/2001 | Fuente | 711/136 |
| 6,360,299 B1 * | 3/2002 | Arimilli et al. | 711/137 |
| 7,127,586 B2 * | 10/2006 | Mowry | 711/204 |
| 2002/0019723 A1 * | 2/2002 | Zwiegincew et al. | 702/186 |
| 2003/0191901 A1 * | 10/2003 | Hill et al. | 711/137 |

FOREIGN PATENT DOCUMENTS

EP 0173893 3/1986

OTHER PUBLICATIONS

Zhang et al., "Speeding Up Irregular Applications in Shared-Memory Multiprocessors: Memory Binding and Group Prefetching", Computer Architecture news, vol. 23, No. 2, May 1, 1995, pp. 188-189.

* cited by examiner

*Primary Examiner* — Kevin L Ellis
*Assistant Examiner* — Matthew Bradley
(74) *Attorney, Agent, or Firm* — F. Chau & Associates, LLC

(57) ABSTRACT

A computer system and a method for enhancing the cache prefetch behavior. A computer system including a processor, a main memory, a prefetch controller, a cache memory, a prefetch buffer, and a main memory, wherein each page in the main memory has associated with it a tag, which is used for controlling the prefetching of a variable subset of lines from this page as well as lines from at least one other page. And, coupled to the processor is a prefetch controller, wherein the prefetch controller responds to the processor determining a fault (or miss) occurred to a line of data by fetching a corresponding line of data with the corresponding tag, with the corresponding tag to be stored in the prefetch buffer, and sending the corresponding line of data to the cache memory.

17 Claims, 5 Drawing Sheets

| BIT VECTORS FOR HISTORY |
|---|
| $V_1$ 1, 2, ..........., 32 |
| $V_2$ 1, 2, ..........., 32 |
| BIT VECTORS FOR DIRECTED PREFETCHING |
| $V_s$ 1, 2, ..........., 32 |
| Address for Page g |
| Decision bit $D_d$ |

FIG. 2

PAGE DESCRIPTORS FOR PREFETCHING AND MEMORY MANAGEMENT

CROSS-REFERENCE TO RELATED APPLICATIONS

This application is a Continuation of U.S. application Ser. No. 10/326,634 filed on Dec. 20, 2002, now U.S. Pat. No. 7,334,088, which are each incorporated by reference herein in their entirety.

BACKGROUND OF THE INVENTION

1. Technical Field

The present disclosure relates generally to a computer system having a processor, a main memory, and a cache, and more particularly to a computer system and a method for enhancing cache prefetch behavior.

2. Discussion of Related Art

A common problem in computer design is the increasing latency, in terms of processor cycles, required for transferring data or information between the processor (or processors) and the main memory of a computer system. The increasing number of processor cycles has led to ever-larger caches on the processor chip, but this approach is yielding diminishing returns. Another approach to decreasing memory latency is to attempt to prefetch data into the cache or caches. There have been a large number of proposed mechanisms for prefetching, and prefetching is employed in numerous computer systems. One common approach is (given a cache fault to a line $L(i,j)$, denoting the $i^{th}$ line in page j) to not only fetch the desired line but to also fetch the next line. In the paper entitled "Special Section on High Performance Memory Systems," (IEEE Transactions on Computers, Vol. 50, No. 11, November 2001) the paper includes a description of the overall problem and various approaches to its alleviation.

In the prefetching schemes mentioned above and in current prefetching schemes, these schemes operate by observing current access behavior, for example which lines are being fetched, and possibly their relation to other lines currently in the cache.

In the paper entitled "Adaptive Variation of the Transfer Unit in a Storage Hierarchy," (P. A Franaszek and B. T. Bennett, IBM J. Res. Develop, Vol. 22, No. 4, July 1978, pp. 405-412) the paper discusses a scheme where prefetching in a storage hierarchy is based on information stored in memory on references to individual pages. For example, information is stored and updated which determines, given a fault to a page, whether just the page should be fetched, or the page and a fixed set of other pages should also be fetched. The method in the paper discussed above applies to fetching pages into main memory from disk storage rather than cache lines from main memory.

The prior art prefetching methods do not take into account access pattern behavior useful for improving prefetching performance.

A need therefore exists for improving prefetching performance by storing and updating relevant information on access patterns, as well as software-provided prefetch directives, for each individual page in memory.

SUMMARY OF THE INVENTION

In a computer system, cache prefetch behavior is enhanced by maintaining a Page History Tag (or PHT) for each page in the system, which determines prefetch behavior. This history tag may be updated by either the cache hardware, the operating system, or other suitable software. Given a cache fault to a line $L(i,j)$, the PHT for page j, denoted by $H(j)$, is accessed. $H(j)$ then determines which lines or pages are prefetched.

In an embodiment of the present invention, a tag for each page is maintained which holds information for cache accesses and prefetching to a plurality of lines in the page and other pages. Thus, given a fault to a line, tag information can be used to prefetch selected variable subsets of lines from the page, where the desired line is located, and from additional pages. Another embodiment of the present invention provides the insertion in the page tags of software-provided directives for prefetching.

Another embodiment of the present invention provides a computer system comprising a processor, a main memory, wherein each page in the main memory has associated with it a tag, which is used for prefetching of a variable subset of lines from this page as well as lines from at least one other page, a cache memory coupled to the processor and the main memory, wherein a block of data or page of information is read from the main memory and stored in the cache memory, a prefetch controller coupled to the processor, wherein the prefetch controller responds to the processor determining a fault (or miss) line has been found in the page being held in the cache memory, and a prefetch buffer coupled to the prefetch controller, the cache memory, and the main memory, wherein the prefetch controller responds to the detection of the faulted line by fetching a corresponding line of data with the corresponding tag to be stored in the prefetch buffer and sending the corresponding line of data to the cache memory.

The computer system also provides updating of the prefetch buffer by deleting a tag that has been held in the prefetch buffer for the longest amount of time, and storing the updated version of the tag in the main memory.

Further, the updating of tags may be determined by the occurrence of accesses to individual lines within a page.

Also, the prefetching of lines in a page may be a function of the information stored in its corresponding tag and the accessing to lines in the page.

In addition, the computer system above provides a means for storing tags and a processor for processing tags, wherein the processor includes updating the tags for prefetching and determining which tags should be held in the prefetch buffer.

Further, the computer system above provides a means for modifying and updating the tags based upon a monitoring of accesses to cache lines.

Another embodiment of the present invention provides a prefetch method for transferring information (data) within a computer system includes detecting a faulted line within a given page, accessing a page history tag associated with the given page, and determining from the page history tag which lines or pages are to be prefetched.

In addition, the method above may include replacing selected tags and lines within the prefetch buffer.

Further, the step of detecting a faulted line in the method above may include placing the faulted line into the cache memory, determining if the faulted line is currently in the prefetch buffer, fetching the associated selected tag into the prefetch buffer from the main memory if the tag is not currently in the prefetch buffer, and replacing a pre-existing selected tag with the associated selected tag prefetched from the main memory, and updating the information associated with this tag and page into the main memory.

Also, the method step of accessing the tag in the method above may include storing information, corresponding to accesses to a page, on the tag, wherein the tag includes at least a first and second history vectors, and denoting an ith bit of the at least first and second vectors to determine whether a line corresponding to the tag in the prefetch buffer was accessed.

BRIEF DESCRIPTION OF THE DRAWINGS

Detailed exemplary embodiments of the invention will become more apparent when read with reference to the attached drawings in which:

FIG. 2 is a chart illustrating the format for Page History Tags or PHTs, according to another embodiment of the present invention.

DETAILED DESCRIPTION OF EXEMPLARY EMBODIMENTS

It is to be understood that systems and methods described herein in accordance with the present invention may be implemented in various forms of hardware, software, firmware, special purpose processors, or any combination thereof. Preferably, the present invention is implemented in software as an application comprising program instructions that are tangibly embodied on one or more program storage devices (e.g. magnetic floppy disk, RAM, CD Rom, Rom and flash memory), and executable by any device or machine comprising suitable architecture.

It is to be further understood that since the constituent system modules and method steps depicted in the accompanying figures are preferably implemented in software, the actual connection between the system components (or the flow of the process steps) may differ depending upon the manner in which the present invention is programmed. Given the teachings herein, one of ordinary skill in the related art will be able to contemplate these and similar implementations or configurations of the present invention.

Figure 1:
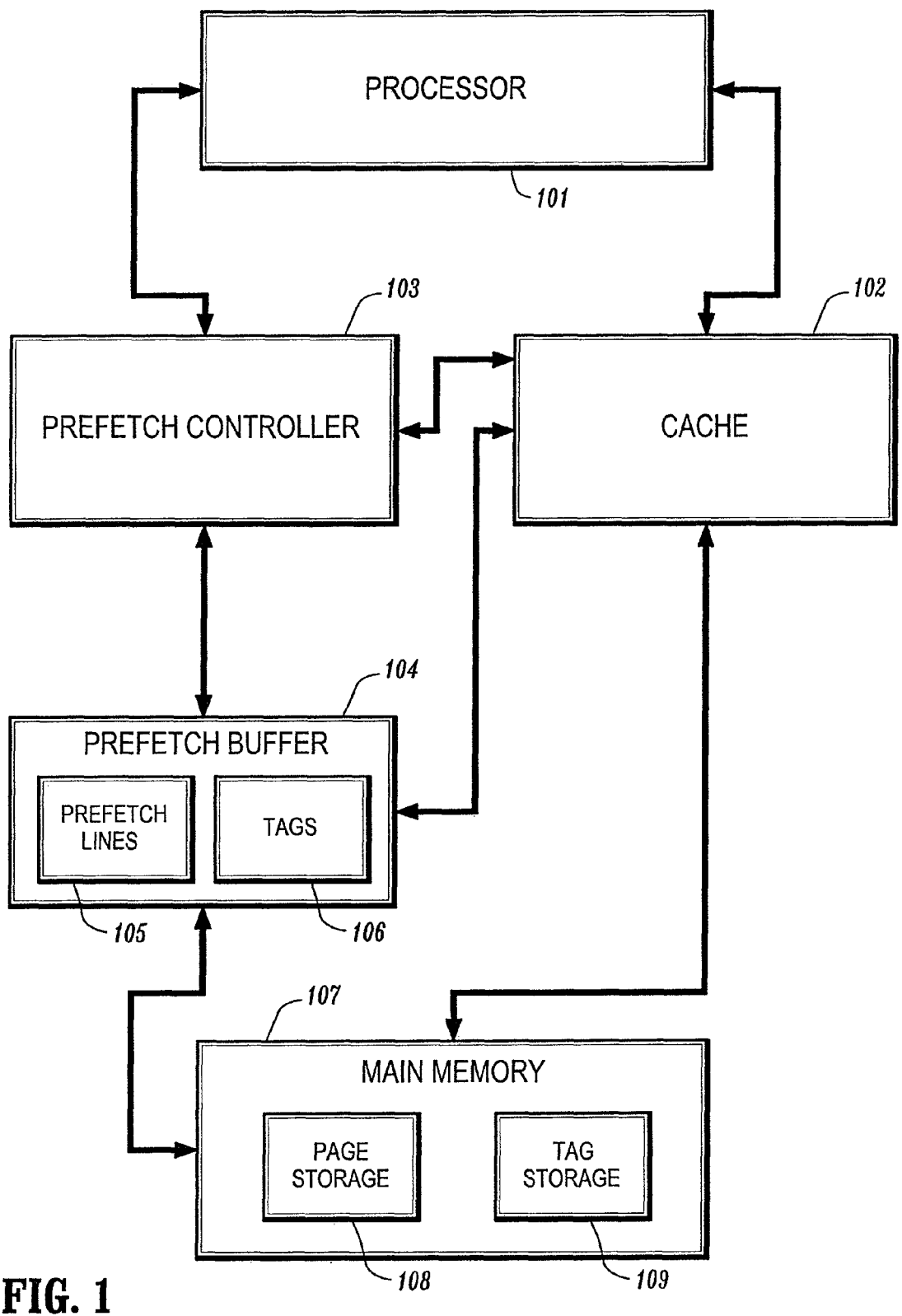
FIG. 1 is a block diagram illustrating the structure of a computer system, according to an embodiment of the present invention.

FIG. 1 shows a block diagram of a computer system. The computer system comprises a processor 101, a cache 102, a prefetch buffer 104 which holds prefetch lines 105 and tags 106, a prefetch controller 103, and a main memory 107 which stores a tag H(j) 109 for each page j in memory and stores each page j in memory 108. The tags can be addressed individually by the processor, and thus by the software. For purposes of illustration, each line in this system is of 128 bytes, and each page contains 32 such lines, or 4K bytes. The prefetch buffer may be divided into two parts, a part 105 that holds prefetched lines, and another part 106 to hold tags. In the present embodiment, each of the prefetched lines and tags are replaced by a first-in-first-out or FIFO basis (or any other suitable method). For example, when some set of n lines is prefetched from page j, the n lines presently in the prefetch buffer which have been there longest are deleted. Similarly, If there is a fault to a page j whose tag is not currently in the prefetch buffer, the associated tag is fetched into the buffer from the main memory 107. The associated tag which has been there the longest is deleted, and its updated value, as described below and in FIG. 4, is stored back into main memory 107.

Figure 1A:
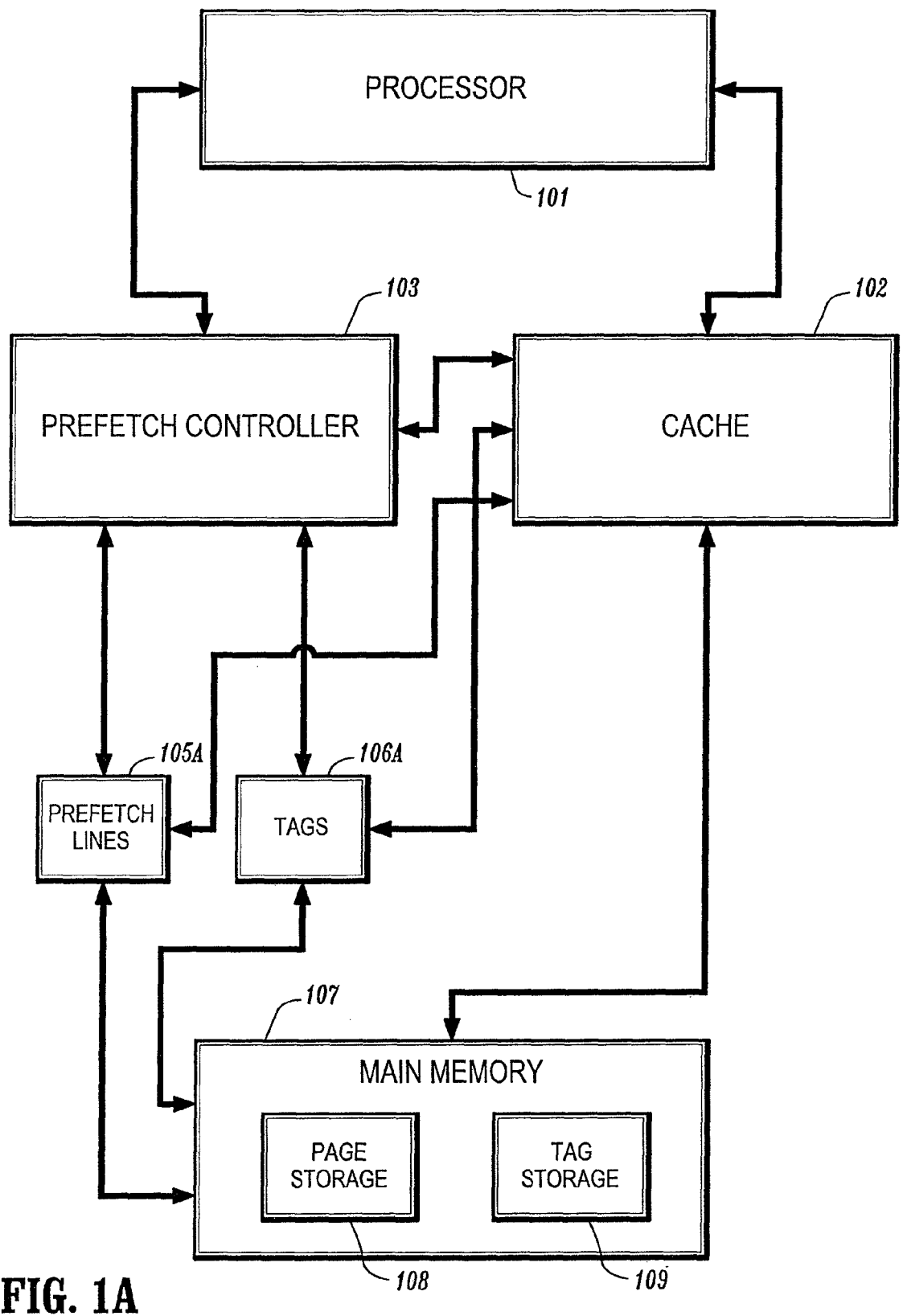
FIG. 1A is a block diagram illustrating the structure of a computer system, according to another embodiment of the present invention.

FIG. 1a shows a block diagram illustrating the structure of a computer system, according to another embodiment of the present invention. More specifically, FIG. 1A shows the computer system of FIG. 1 with the added feature that the prefetch 104 may be separated into at least two prefetch buffers. In this embodiment, a prefetch lines buffer 105A and a tags buffer 106A.

FIG. 2 shows the format for information stored in a tag H(j). For purposes of illustration in this embodiment, the tag includes two history vectors used to store relevant information on accesses to this page. Each vector has 32 entries, each of one bit, where the ith bit denotes whether or not the ith line in this page was accessed during some visit of the tag in the prefetch buffer 106. Vector $V_1$ has an entry of 1 for each cache line referenced during the most recent visit of H(j) into 106. Vector $V_2$ is used to collect this information for a current visit. And, the ith entry in vector $V_2$ is set to 1 if line L(i,j) is referenced in the current visit of tag H(j) into buffer 106. Also included in the tag is a 32 bit vector VS which can be set by the software to mandate prefetching as well as the address of a page g which is to be prefetched given an access to the present page, and given that a decision bit $D_d$ is set to 1 by the software or computer system. If $D_d$ is set to zero by the software or the computer system, the page g is not to be prefetched. In the present embodiment, the address of page g is set by the software, as is the decision bit $D_d$.

Figure 3:
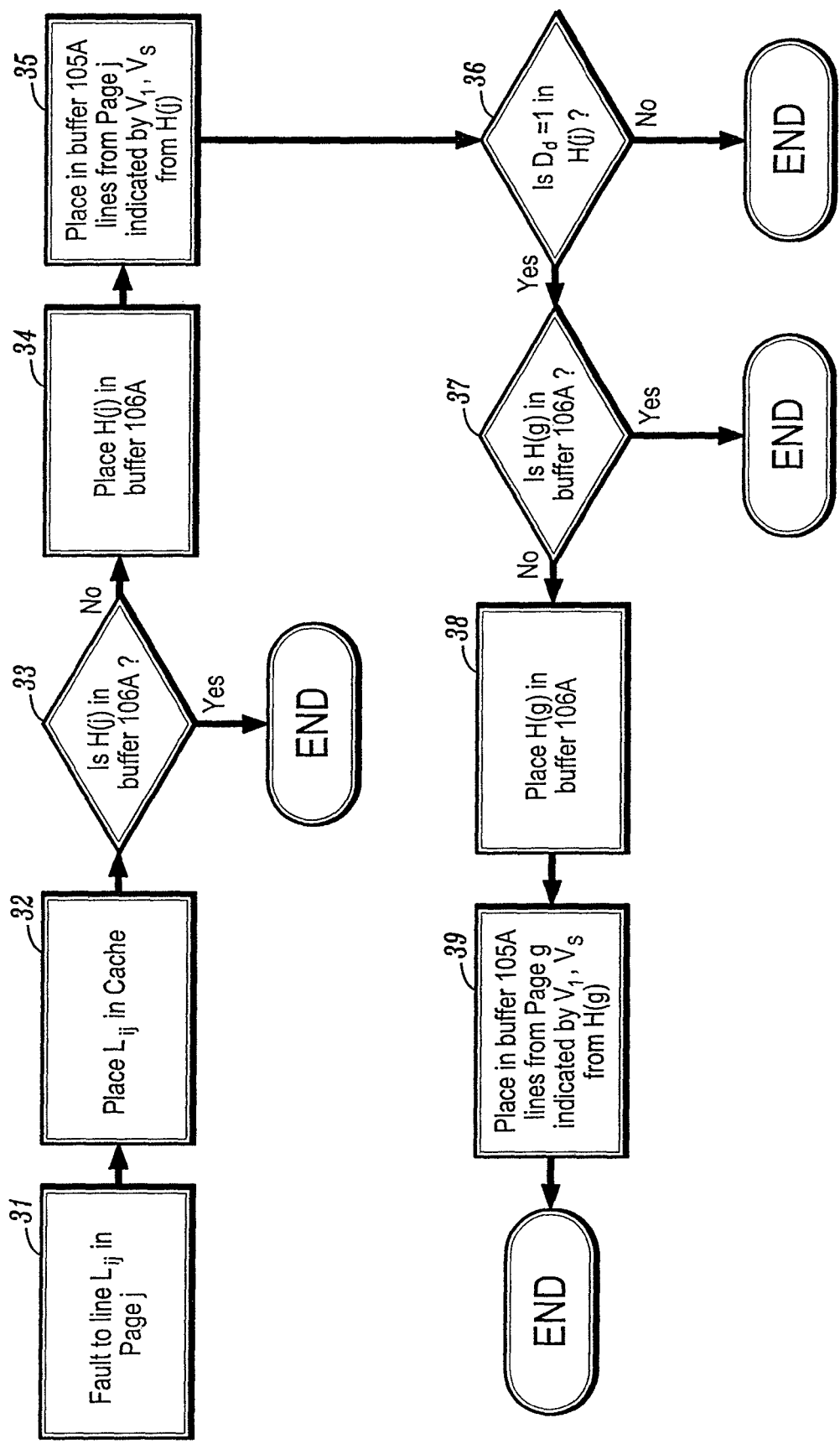
FIG. 3 is a flow chart illustrating the control flow for prefetch decisions, according to another embodiment of the present invention.

Another embodiment of the present invention provides the prefetch controller processor executing a program loaded by the operating system. FIG. 3 illustrates a method in relation to the system illustrated in FIG. 1A. In this embodiment, as shown in FIG. 3, a reference is given to a line L(i,j) not currently in the cache 102 (referred to as a fault line), Step 31. The desired line is fetched into the cache from buffer 105A or main memory 107, step 32. If the desired line is not located in the buffer 105A, then the desired line is fetched from the main memory 107. Next, the location of the associated tag needs to be ascertained, step 33. If the associated tag is not located in the buffer 106A, then the associated tag is fetched into the buffer 106A from the main memory 107, step 34. Upon fetching the tag H(j) into buffer 106A (step 34), the controller examines the bit vectors stored in the tags to determine which lines or pages to prefetch. In this embodiment, those lines corresponding to 1 entries in the vectors $V_1$ and $V_s$ are prefetched and placed in the buffer 105A, step 35. Next, if the decision bit $D_d$ in the tag is set to 1, e.g. the tag indicates that a page g is to be prefetched, step 36. Then, the tag for that page is fetched, those lines are prefetched which correspond, in H(g), to 1 entries in vectors $V_1$ and $V_s$, Steps 37-39. It is noted that steps 37-39 are similar to steps 33-35 except the decision and prefetching steps 37-39 pertain to H(g). Furthermore, in this implementation, if the decision bit $D_d$ in H(g) is set to zero the H(g) is not examined, and there is no further page prefetch (step 36).

Figure 4A:
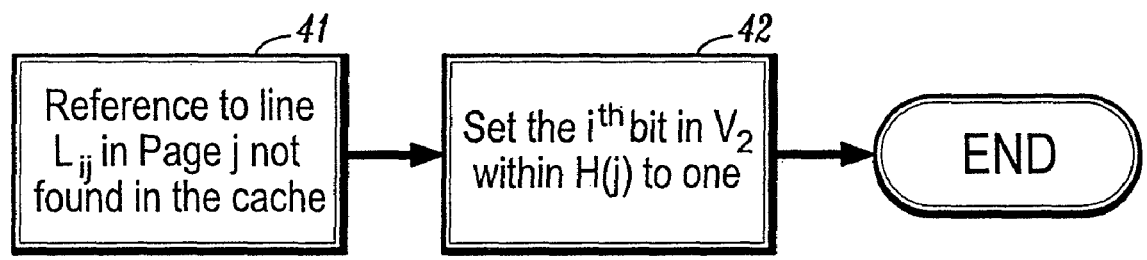
FIGS. 4a and 4b are flow charts illustrating the control flow for updating page history tags, according to another embodiment of the present invention.

FIG. 4A illustrates the updating of the vector $V_2$. If a line L(i,j) not currently in the cache 102 is referenced (Step 41), e.g. there is a fault to L(i,j), a 1 is entered into the ith component of vector $V_2$ in the tag H(j), step 42.

Figure 4B:
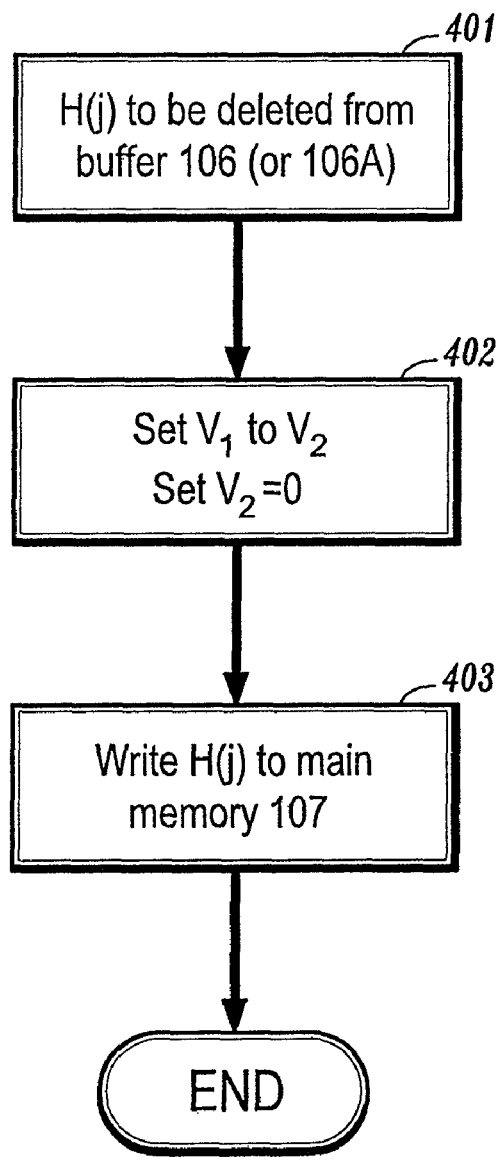

Referring to FIG. 4B, FIG. 4B illustrates a method for updating a tag in the buffer 106, e.g. H(j). Separately, as each tag H(j) is ejected from buffer 106 (step 401), Vector $V_2$ is substituted for $V_1$ in this tag, entries in $V_2$ are set to zero, step 402. Then, H(j) is written back to main memory 107, step 403.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A prefetch method for transferring information (data) within a computer system comprising a processor, a main memory, a cache memory, a prefetch controller, and a prefetch buffer, wherein the prefetch controller is coupled to the processor, the cache memory, and the prefetch buffer, wherein the prefetch buffer is coupled to the prefetch controller, the cache memory, and the main memory, said method comprising the steps of:

detecting a faulted line within a first page;
    accessing a page history tag associated with the first page; and
    determining from the page history tag at least one first line of the first page that is to be prefetched, a second page other than the first page, and based on a decision bit indicating whether at least one second line of the second page is to be prefetched.

2. The method of claim 1 further comprises the steps of:
    replacing the page history tag and the at least one first line within the prefetch buffer.

3. The method of claim 1 further comprises the step of:
    modifying the page history tag by software of the system.

4. The method of claim 1 wherein detecting the faulted line further comprises the steps of:
    placing the faulted line into the cache memory;
    determining if the faulted line is currently in the prefetch buffer;
    fetching the page history tag into the prefetch buffer from the main memory if the page history tag is not currently in the prefetch buffer;
    replacing a pre-existing tag selected with the page history tag; and
    updating information associated with the page history tag into the main memory.

5. The method of claim 1, wherein accessing the page history tag further comprises marking a particular bit of at least a first vector and a second vector of the page history tag to indicate whether a line corresponding to the page history tag in the prefetch buffer was accessed.

6. The method of claim 5, further comprising entering a one in the first vector for each cache line referenced during a most recent visit of the page history tag.

7. The method of claim 5, further comprising entering a one in the second vector for each cache line referenced during a current visit of the page history tag.

8. The method of claim 1, further comprising mandating prefetching of lines of the second page by setting, the decision bit to one.

9. The method of claim 1, further comprising mandating that lines of the second page need not be prefetched by setting the decision bit to zero.

10. The method of claim 1, further comprising prefetching the at least one first line from the main memory to the prefetch buffer and selectively prefetching the at least one second line from the main memory to the prefetch buffer based on a state of the decision bit.

11. The method of claim 10, wherein the selectively prefetching comprises:
    only when the decision bit is set to a first of two different states,
        accessing a second page history tag associated with the second page;
        determining from the second page history tag the at least one second line that are to be prefetched; and
        prefetching the at least one second line of the second page from main memory to the prefetch buffer.

12. A prefetch method for transferring information (data) within a computer system comprising a processor, a main memory, a cache memory, and a prefetch buffer, said method comprising the steps of:
    detecting a faulted line within a given page;
    determining the location of a page history tag associated with the faulted line, wherein the page history tag is located in one of the main memory or the prefetch buffer;
    fetching the page history tag from the main memory into the prefetch buffer; and
    examining a plurality of bit vectors stored in the page history tag to identify a number of lines of a page to be prefetched, an other page, and a decision bit, wherein lines of the other page are to be prefetched based on a state of the decision bit.

13. The method of claim 12, further comprising prefetching the lines of the other page when the decision bit is set to one.

14. A method of prefetching data within a computer system, the method comprising:
    identifying, by a prefetch controller, a first number of lines of a first page of a main memory of the computer system, a second page of the memory other than the first page, and a decision bit from a first tag associated with the first page;
    prefetching, by the prefetch controller, the first number of lines of the first page from the memory into a prefetch buffer of the system; and
    selectively prefetching, by the prefetch controller, lines of a second tag associated with the second page from the memory into the prefetch buffer based on a state of the decision bit.

15. The method of claim 14, wherein the computer system further includes a cache, and a processor, the prefetch controller is coupled to the processor, the cache, and the prefetch buffer, and the main memory is coupled to the cache and the prefetch buffer.

16. The method of claim 15, further comprising:
    sending a command from the processor to the prefetch controller, and
    performing the prefetching by the prefetch controller based on the received command.

17. The method of claim 14, wherein the main memory includes a plurality of pages, wherein each page includes a plurality of lines, and a respective tag formatted as the first tag.

* * * * *